United States Patent
Coleman et al.

(10) Patent No.: US 11,550,898 B2
(45) Date of Patent: Jan. 10, 2023

(54) BROWSER APPLICATION IMPLEMENTING SANDBOX BASED INTERNET ISOLATION

(71) Applicant: L3 Technologies, Inc., New York, NY (US)

(72) Inventors: Glenn Coleman, Berwyn, PA (US); Peter Martz, Marlton, NJ (US); Kenneth Moritz, Lansdowne, PA (US)

(73) Assignee: L3 Technologies, Inc., New York, NY (US)

( * ) Notice: Subject to any disclaimer, the term of this patent is extended or adjusted under 35 U.S.C. 154(b) by 66 days.

(21) Appl. No.: 16/164,342

(22) Filed: Oct. 18, 2018

(65) Prior Publication Data

US 2019/0121963 A1 Apr. 25, 2019

Related U.S. Application Data

(60) Provisional application No. 62/575,735, filed on Oct. 23, 2017.

(51) Int. Cl.
*G06F 21/53* (2013.01)
*H04L 9/40* (2022.01)
*G06F 9/445* (2018.01)

(52) U.S. Cl.
CPC .......... *G06F 21/53* (2013.01); *G06F 9/44526* (2013.01); *H04L 63/0281* (2013.01);
(Continued)

(58) Field of Classification Search
CPC ............. G06F 21/53; G06F 2221/2149; G06F 9/44526; H04L 63/0281; H04L 63/083; H04L 63/101
(Continued)

(56) References Cited

U.S. PATENT DOCUMENTS 7,150,040 B2 12/2006 Brownell
7,467,408 B1 12/2008 Otoole, Jr.
(Continued)

FOREIGN PATENT DOCUMENTS

RU 2406138 C1 12/2010

OTHER PUBLICATIONS

NPL Search Terms (Year: 2020).*
(Continued)

*Primary Examiner* — Syed A Zaidi
(74) *Attorney, Agent, or Firm* — Condo Roccia Koptiw LLP

(57) ABSTRACT

Methods and systems are disclosed for an internet isolation system implemented using a browser application. The host computer system may be configured to receive a request to communicate with a first network destination. The host computer system may determine whether the first network destination is trusted or untrusted. The host computer system may instantiate a browser application. The browser application may be configured to, on a condition that the first network destination is determined to be trusted, enable communication with the first network destination via a first browser process executed in a workspace of the host computer system. The browser application may be configured to, on a condition that the first network destination is determined to be untrusted, implement an isolated computing environment using an internal isolation firewall and enable communication with the first destination via a second browser process executed in the isolated computing environment.

20 Claims, 3 Drawing Sheets

(52) U.S. Cl.
CPC .......... *H04L 63/083* (2013.01); *H04L 63/101* (2013.01); *G06F 2221/2149* (2013.01)

(58) Field of Classification Search
USPC .......................................................... 726/12
See application file for complete search history.

(56) References Cited

U.S. PATENT DOCUMENTS

| | | | |
|---|---|---|---|
| 7,478,330 B1 | 1/2009 | Branson et al. | |
| 7,694,328 B2 | 4/2010 | Joshi et al. | |
| 7,698,442 B1 | 4/2010 | Krishnamurthy et al. | |
| 7,716,720 B1 | 5/2010 | Marek et al. | |
| 7,805,516 B2 | 9/2010 | Kettler et al. | |
| 7,870,153 B2 | 1/2011 | Croft et al. | |
| 7,926,086 B1 | 4/2011 | Violleau et al. | |
| 7,954,150 B2 | 5/2011 | Croft et al. | |
| 7,970,923 B2 | 6/2011 | Pedersen et al. | |
| 8,090,797 B2 | 1/2012 | Chinta et al. | |
| 8,539,561 B2 | 9/2013 | Pingali et al. | |
| 8,566,398 B2 | 10/2013 | Barnier et al. | |
| 8,613,070 B1 | 12/2013 | Borzycki et al. | |
| 8,769,268 B2 | 7/2014 | Morozov et al. | |
| 8,832,833 B2 | 9/2014 | Demopoulos et al. | |
| 8,931,054 B2 | 1/2015 | Huynh et al. | |
| 8,966,464 B1 | 2/2015 | Christopher et al. | |
| 9,294,492 B1 | 3/2016 | Martini et al. | |
| 9,384,026 B1* | 7/2016 | Banga ................ G06F 9/45558 | |
| 9,386,021 B1 | 7/2016 | Pratt | |
| 9,438,634 B1 | 9/2016 | Ross et al. | |
| 9,465,734 B1 | 10/2016 | Myrick et al. | |
| 9,531,715 B1 | 12/2016 | Rodgers et al. | |
| 9,560,081 B1 | 1/2017 | Woolward | |
| 9,602,524 B2 | 3/2017 | Ghosh et al. | |
| 9,609,026 B2 | 3/2017 | Ross et al. | |
| 9,680,873 B1 | 6/2017 | Halls et al. | |
| 9,729,579 B1 | 8/2017 | Marino et al. | |
| 9,787,639 B1 | 10/2017 | Sun et al. | |
| 9,864,600 B2 | 1/2018 | Larimore et al. | |
| 9,921,860 B1 | 3/2018 | Banga et al. | |
| 9,942,198 B2 | 4/2018 | Hoy et al. | |
| 10,037,199 B2 | 7/2018 | Hung et al. | |
| 10,055,231 B1 | 8/2018 | Li et al. | |
| 10,104,120 B2 | 10/2018 | Gopalakrishna | |
| 10,122,703 B2 | 11/2018 | Innes et al. | |
| 10,375,111 B2 | 8/2019 | Schultz et al. | |
| 10,397,273 B1 | 8/2019 | Stickle et al. | |
| 10,521,612 B2 | 12/2019 | Arad et al. | |
| 10,554,475 B2 | 2/2020 | Weinstein et al. | |
| 10,558,798 B2 | 2/2020 | Weinstein et al. | |
| 10,873,589 B2 | 12/2020 | Cheetancheri et al. | |
| 10,931,669 B2 | 2/2021 | Coleman et al. | |
| 2002/0023212 A1 | 2/2002 | Proudler | |
| 2002/0040439 A1 | 4/2002 | Kellum | |
| 2002/0069366 A1 | 6/2002 | Schoettger | |
| 2002/0069369 A1 | 6/2002 | Tremain et al. | |
| 2004/0249938 A1 | 12/2004 | Bunch | |
| 2005/0144467 A1 | 6/2005 | Yamazaki | |
| 2006/0070066 A1 | 3/2006 | Grobman | |
| 2006/0282795 A1* | 12/2006 | Clark ................ H04L 61/3015 715/840 | |
| 2007/0136579 A1* | 6/2007 | Levy ................ H04L 67/02 713/168 | |
| 2007/0220187 A1 | 9/2007 | Kates | |
| 2007/0260873 A1 | 11/2007 | Hatfalvi et al. | |
| 2008/0016313 A1 | 1/2008 | Murotake et al. | |
| 2008/0028401 A1 | 1/2008 | Geisinger | |
| 2008/0201711 A1 | 8/2008 | Amir Husain | |
| 2008/0256536 A1 | 10/2008 | Zhao et al. | |
| 2009/0055924 A1 | 2/2009 | Trotter | |
| 2009/0164994 A1 | 6/2009 | Vasilevsky et al. | |
| 2009/0172781 A1 | 7/2009 | Masuoka et al. | |
| 2009/0249472 A1 | 10/2009 | Benjamini et al. | |
| 2009/0265760 A1* | 10/2009 | Zhu ................ H04L 63/10 726/3 | |
| 2009/0328038 A1 | 12/2009 | Yamada et al. | |
| 2010/0138829 A1 | 6/2010 | Hanquez et al. | |
| 2010/0138830 A1 | 6/2010 | Astete et al. | |
| 2010/0217916 A1 | 8/2010 | Gao et al. | |
| 2010/0223613 A1 | 9/2010 | Schneider | |
| 2010/0251329 A1 | 9/2010 | Wei | |
| 2011/0154431 A1 | 6/2011 | Walsh | |
| 2011/0299515 A1 | 12/2011 | Robertson et al. | |
| 2012/0017213 A1 | 1/2012 | Hunt et al. | |
| 2012/0023593 A1 | 1/2012 | Puder et al. | |
| 2012/0054744 A1 | 3/2012 | Singh et al. | |
| 2012/0265976 A1 | 10/2012 | Spiers et al. | |
| 2012/0266149 A1 | 10/2012 | Lebert | |
| 2013/0132948 A1* | 5/2013 | Hari ................ G06F 9/45558 718/1 | |
| 2013/0145463 A1 | 6/2013 | Ghosh et al. | |
| 2013/0318594 A1* | 11/2013 | Hoy ................ G06F 21/53 726/15 | |
| 2014/0040979 A1 | 2/2014 | Barton et al. | |
| 2014/0059642 A1 | 2/2014 | Deasy et al. | |
| 2014/0075535 A1 | 3/2014 | Soffer et al. | |
| 2014/0108558 A1 | 4/2014 | Borzycki et al. | |
| 2014/0115646 A1 | 4/2014 | Rajgopal et al. | |
| 2014/0215621 A1 | 7/2014 | Xaypanya et al. | |
| 2014/0282890 A1 | 9/2014 | Li et al. | |
| 2014/0310810 A1 | 10/2014 | Brueckner et al. | |
| 2014/0344912 A1 | 11/2014 | Chapman et al. | |
| 2014/0344928 A1* | 11/2014 | Sreedharan ......... H04L 63/1466 726/22 | |
| 2014/0351516 A1 | 11/2014 | Larimore et al. | |
| 2014/0380403 A1 | 12/2014 | Pearson et al. | |
| 2014/0380412 A1 | 12/2014 | Fitzgerald et al. | |
| 2014/0380480 A1* | 12/2014 | Tang ................ H04L 63/1408 726/24 | |
| 2015/0058923 A1* | 2/2015 | Rajagopal ............... H04L 63/20 726/1 | |
| 2015/0106822 A1 | 4/2015 | Lei | |
| 2015/0143374 A1* | 5/2015 | Banga ................ G06F 9/5077 718/1 | |
| 2015/0156203 A1 | 6/2015 | Giura et al. | |
| 2015/0161277 A1* | 6/2015 | Heller ................ G06F 9/44526 715/229 | |
| 2015/0248554 A1 | 9/2015 | Dumitru et al. | |
| 2015/0281176 A1 | 10/2015 | Banfield | |
| 2016/0057167 A1* | 2/2016 | Bach ................ H04L 63/101 726/23 | |
| 2016/0134549 A1 | 5/2016 | Abel et al. | |
| 2016/0154539 A1* | 6/2016 | Buddhiraja ......... G06F 9/45558 715/738 | |
| 2016/0226834 A1 | 8/2016 | Dawson | |
| 2016/0246974 A1 | 8/2016 | Broz et al. | |
| 2016/0248754 A1 | 8/2016 | Jahr | |
| 2016/0292694 A1 | 10/2016 | Goldschlag et al. | |
| 2016/0308895 A1 | 10/2016 | Kotler et al. | |
| 2017/0034174 A1 | 2/2017 | Jägers | |
| 2017/0041338 A1 | 2/2017 | Martini et al. | |
| 2017/0076092 A1 | 3/2017 | Kashyap et al. | |
| 2017/0142144 A1 | 5/2017 | Weinberger et al. | |
| 2017/0180413 A1 | 6/2017 | Petry et al. | |
| 2017/0206351 A1 | 7/2017 | Jay et al. | |
| 2017/0208067 A1 | 7/2017 | Sriramakrishnan | |
| 2017/0250997 A1* | 8/2017 | Rostamabadi ...... H04L 63/1425 | |
| 2017/0251002 A1* | 8/2017 | Rostamabadi ........ G06F 21/566 | |
| 2017/0293432 A1 | 10/2017 | Oldcorn et al. | |
| 2017/0317978 A1 | 11/2017 | Diaz-cuellar et al. | |
| 2017/0353496 A1 | 12/2017 | Pai et al. | |
| 2017/0359309 A1 | 12/2017 | Bolte et al. | |
| 2018/0027006 A1 | 1/2018 | Zimmermann et al. | |
| 2018/0115519 A1 | 4/2018 | Bonomi et al. | |
| 2018/0139178 A1 | 5/2018 | Gan | |
| 2018/0196945 A1 | 7/2018 | Kornegay et al. | |
| 2018/0198824 A1 | 7/2018 | Pulapaka et al. | |
| 2018/0203995 A1 | 7/2018 | Yuen et al. | |
| 2018/0234422 A1 | 8/2018 | Odom et al. | |
| 2018/0276396 A1 | 9/2018 | Yablokov et al. | |
| 2018/0330257 A1 | 11/2018 | Dodson et al. | |
| 2018/0367528 A1 | 12/2018 | Schwarz et al. | |
| 2019/0097970 A1 | 3/2019 | Coleman et al. | |

(56) References Cited

U.S. PATENT DOCUMENTS

| | | |
|---|---|---|
| 2019/0097972 A1 | 3/2019 | Coleman et al. |
| 2019/0098007 A1 | 3/2019 | Coleman et al. |
| 2019/0098020 A1 | 3/2019 | Martz et al. |
| 2019/0121961 A1 | 4/2019 | Coleman et al. |
| 2019/0121962 A1 | 4/2019 | Coleman et al. |
| 2019/0213325 A1 | 7/2019 | Mckerchar et al. |

OTHER PUBLICATIONS

Srivastava, Abhinav, and Jonathon Giffin. "Tamper-resistant, application-aware blocking of malicious network connections." International Workshop on Recent Advances in Intrusion Detection. Springer, Berlin, Heidelberg, 2008. (Year: 2008).*

NPL Search Terms (Year: 2022).*

Barnet, Mark, "Praktikum Po Zaschite Seti Kompanii", Windows IT Pro/RE, Nov.-Dec. 2006, pp. 79-81.

Burnett, Mark, "How I Secured One Company's Network", Using Log Parser, Virtualization, and A Little Psychology, Sep. 17, 2006, 4 pages.

Laverick, Mike, "Hypervisor Management and Optimization for Advanced Virtualization", E-book, TechTarget, 2010, 13 pages.

Li et al., "VSITE: A Scalable and Secure Architecture for Seamless L2 Enterprise Extension in the Cloud", 6th IEEE Workshop on Secure Network Protocols (NPSec), Oct. 2010, pp. 31-36.

Reuben, Jenni Susan, "A Survey on Virtual Machine Security", TKK T-110.5290 Seminar on Network Security, Oct. 11-12, 2007, 5 pages.

Villeneuve, Nart, "Command and Control in the Cloud", Malware Explorer, Oct. 22, 2010, 3 pages.

Wikipedia, "Computer Networking", Available at https://en.wikipedia.org/wiki/Computer_network, Dec. 2010, 19 pages.

Wikipedia, "Computer Security", Available at https://en.wikipedia.org/wiki/Computer_security, retrieved on Dec. 2010, 27 pages.

Wikipedia, "Cyber Security Standards", Available at https://en.wikipedia.org/wiki/Cyber_security_standards, retrieved on Dec. 2010, 9 pages.

Wikipedia, "HTTP Secure", Available at https://en.wikipedia.orq/wiki/HTTPS, retrieved on Dec. 2010, 9 pages.

Wikipedia, "Hypervisor", Available at <https://en.wikipedia.org/wiki/Hypervisor>, retrieved on Dec. 2010, 6 pages.

Wikipedia, "Internet Protocol", Available at https://en.wikipedia.org/wiki/Internet_Protocol, retrieved on Dec. 2010, 5 pages.

Wikipedia, "Multiprotocol Label Switching", Available at <https://en.wikipedia.org/wiki/Multiprotocol_Label_Switching>, retrieved on Dec. 2010, 8 pages.

Wikipedia, "Network Address Translation", Available at https://en.wikipedia.org/wiki/Network_address_translation, Dec. 2010, 12 pages.

Wikipedia, "Security-Focused Operating System", Available at https://en.wikipedia.org/wiki/Security-focused_operating_system, retrieved on Dec. 2010, 9 pages.

Wikipedia, "Virtual Desktop", Available at https://en.wikipedia.om/wiki/Virtual_desktop, retrieved on Dec. 2010, 5 pages.

Wikipedia, "Virtual Private Network", Available at https://en.wikipedia.org/wiki/Virtual_private_network, retrieved on Dec. 2010, 9 pages.

Azab, Ahmed M. et al., "SICE: A Hardware-Level Strongly Isolated Computing Environment for x86 Multi-core Platforms", CCS '11; Chicago, Illinois; ACM, Oct. 2011, 14 pages.

Bruckman, Amy et al., ""Georgia Computes!": Improving the Computing Education Pipeline", Proceeding of the 40th ACM technical symposium on Computer Science Education, 2009, pp. 86-90.

Comodo, "Comodo Internet Security", Software Version 7.0; User Guide Version 7.0.111114, 2014, 579 pages.

Gupta, Aditi et al., "A secure architecture design based on application isolation, code minimization and randomization", IEEE; 6th Symposium on Security Analytics and Automation 2013, 2013, 7 pages.

Hsu, Terry C. et al., "Enforcing Least Privilege Memory Views for Multithreaded Applications", CCS '16; Vienna, Austria; ACM, Oct. 2016, 13 pages.

Jauernig, Patrick et al., "Trusted Execution Environments: Properties, Applications, and Challenges", IEEE Computer and Reliability Societies; Resilient Security, Mar.-Apr. 2020, 5 pages.

Jung, et al., "An Architecture for Virtualization-based Trusted Execution Environment on Mobile Devices", IEEE, 978-1-4799-7646-1/14, 2014, pp. 540-547.

Kostiainen, Kari et al., "Dedicated Security Chips in the Age of Secure Enclaves", IEEE Computerand Reliability Societies; Hardware-Assisted Security, Sep.-Oct. 2020, 9 pages.

Liu, Yutao et al., "Thwarting Memory Disclosure with Efficient Hypervisor-enforced Intra-domain Isolation", CCS '15; Denver, Colorado; ACM, Oct. 2016, 13 pages.

Phuoc Le, Huu et al., "Computing the Real Isolated Points of an Algebraic Hypersurface", International Symposium on Symbolic and Algebraic Computation, Jul. 2020, pp. 297-304.

Ul Haq, Muhammads. et al., "Design and Implementation of Sandbox Technique for Isolated Applications", IEEE; School of Computer Science and Technology, Beijing Institute of Technology; Beijing, China, 2016, 5 pages.

Yadav, Prashant S. et al., "Impact & Analysis of Virtual Workspace on Grid Computing", International Journal of Science & Technology (IJST); vol. 2, Issue 2, Apr. 2012, 9 pages.

Yee, Bennet et al., "Native Client: A Sandbox for Portable, Untrusted x86 Native Code", IEEE; 2009 30th IEEE Symposium on Security and Privacy, 2009,15 pages.

Chen, Yaohui et al., "Shreds: Fine-Grained Execution Units", 2016 IEEE Symposium on Security and Privacy, 2016, pp. 1-16.

Evtyushkin, Dmitry et al., "ISO-X: A Flexible Architecture for Hardware-Managed Isolated Execution", 2014 47th Annual IEEE/ACM International Symposium on Microarchitecture, 2014, pp. 1-13.

Mambretti, Andrea et al., "Trellis: Privilege Separation for Multi-User Applications Made Easy", 2016, pp. 1-20.

* cited by examiner

BROWSER APPLICATION IMPLEMENTING SANDBOX BASED INTERNET ISOLATION

CROSS-REFERENCE TO RELATED APPLICATIONS

This application claims the benefit of U.S. Provisional Patent Application No. 62/575,735, filed Oct. 23, 2017, the contents of which is hereby incorporated by reference in its entirety.

BACKGROUND

The Internet provides access to a large number of systems from which beneficial and/or harmful data may be retrieved by a host computer system attached to and communicating over the Internet. Harmful data that can be accessed through the Internet includes a variety of viral software constructs, generally referred to as malicious software or malware. Malware may be downloaded to a host computer system unintentionally, for example, by and/or without the knowledge of the user of the host computer system.

A host computer system that has downloaded malware may be referred to as an infected host computer system. An infected host computer system may result in possible security losses, reduction of efficiency, and/or malfunctions. Security losses may include, but are not limited to, the loss of some or all data that is accessible by the infected host computer system, the installation of additional malware onto the infected host computer system, and/or the loss of command and control of the infected host computer system. Reduction of efficiency may be incurred from, but not limited to, additional processor demand, additional memory usage, and/or additional network access by the executing malware The security and privacy of the user of the infected host computer system may be compromised by malware. Both information located on the infected host computer system and/or information stored on or communicated via a local area network may be susceptible to attack by the malware. In many instances, an infected host computer may be used by the malware as a vehicle to stage an attack on other network resources that are accessible from the infected host computer system. Such an attack method is often undetected by the user of the host computer system and/or network administrators.

An infected host computer system may lose command and control. The loss of command and control of the infected host computer system may include performing one or more actions the author of the downloaded malware may desire. For example, the malware may perform a reconnaissance of the infected host computer system, determine system privileges, access local files, access security tokens, and/or attempt infection or access of other network resources accessible from the infected computer system

SUMMARY OF THE INVENTION

Methods and systems are disclosed for an internet isolation system implemented using a browser application. The internet isolation system may be a sandbox-based internet isolation system. The browser application may be a web application, a web browser, an internet browser, a mobile browser, a browser program, and/or the like. A host computer system may include a processor and a memory. The host computer system may be configured to implement an operating system that enables operation of a workspace. The workspace may be configured to enable operation of a set of one or more applications or processes via a first memory space. The host computer system may be configured to receive a request to communicate with a first network destination. The host computer system may determine whether the first network destination is trusted or untrusted.

The host computer system may instantiate a browser application. The browser application may be configured to, on a condition that the first network destination is determined to be trusted, enable communication with the first network destination via a first browser process executed in the workspace. The browser application may be configured to, on a condition that the first network destination is determined to be untrusted, implement an isolated computing environment using an internal isolation firewall. The isolated computing environment may include a sandboxed computing environment enforced by a sandbox container process that enables the internal isolation firewall. The isolated computing environment may be implemented via a browser application plug-in. The internal isolation firewall may be configured to prevent data from being communicated between the isolated computing environment and the workspace, for example, without an explicit user input. The browser application may be configured to enable communication with the first network destination via a second browser process executed in the isolated computing environment using a second memory space. The browser application may be configured to receive configuration files associated with the host computer system. The configuration files may include a whitelist, a blacklist, and/or authentication credentials. The whitelist may include a list of trusted network destinations. The blacklist may include a list of untrusted network destinations.

The host computer system may be configured to determine whether the first network destination is trusted or untrusted based on one or more of the whitelist or the blacklist. The browser application may be configured to switch between the first browser process to communicate with trusted network destinations and the second browser process to communicate with untrusted network destinations based on whether the first network destination is trusted or untrusted. The browser application may be configured to authenticate (e.g., using the authentication credentials in the configuration files) with an authorization device to enable communication with the untrusted network destination. The second browser process may be configured to communicate with the untrusted network destination via a proxy device.

The isolated computing environment may include two or more sandboxed computing environments. A first sandboxed computing environment may be configured to communicate with a first subset of untrusted network destinations associated with one or more of a first category or a first risk level. A second sandboxed computing environment may be configured to communicate with a second subset of untrusted network destinations associated with one or more of a second category or a second risk level. The first browser process may be associated with a first tab of the browser application. The first tab may be configured to enable communication with trusted network destinations. The second browser process may be associated with a second tab of the browser application. The second tab may be configured to enable communication with untrusted network destinations.

DETAILED DESCRIPTION

Figure 1:
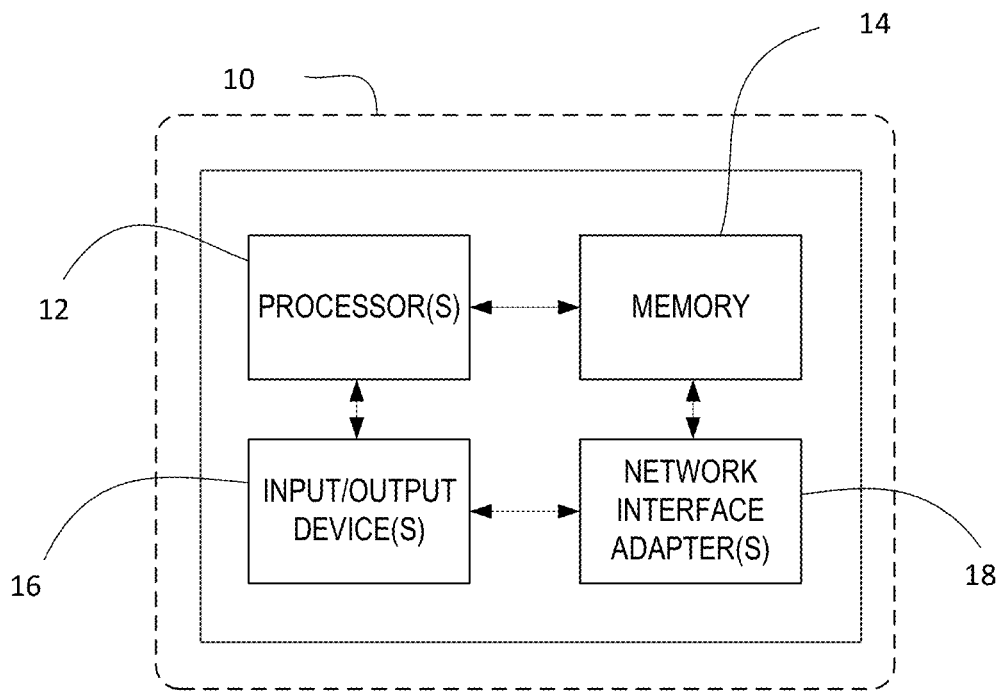
FIG. 1 depicts an example host computer system.

Methods and systems are disclosed for an internet isolation system implemented using a browser application. The internet isolation system may be a sandbox-based internet isolation system. The browser application may be a web application, a web browser, an internet browser, a mobile browser, a browser program, and/or the like. The browser application may be configured to run on various host computer systems, for example, such as a desktop computer, a laptop computer, a tablet, a mobile phone, a smartphone, and/or the like. The internet isolation system may include one or more segregated memory spaces, one or more internal isolation firewalls, an authentication mechanism, an encryption mechanism, a blacklist, a whitelist, and/or a browser switching function. The internet isolation system may be implemented within the browser application and/or a browser application suite that includes the browser application. As another example, the internet isolation system may be implemented via one or more plug-in applications configured to run within a web browser application.

Internet isolation, which may be referred to herein as communication isolation, may be provided via memory space segregation. Memory space segregation may include enforcing multiple separate memory spaces on a host computer system. The multiple separate memory spaces may include a trusted memory space and one or more untrusted memory spaces. The trusted memory space may be a workspace of the operating system of the host computer system. For example, one or more browser processes may be configured to enable an untrusted memory space. The untrusted memory space may be configured to enable the browser executable(s) and/or a sandbox firewall running therein. Each browser process may be associated with a respective instance of the browser application. For example, an instance of the browser application (e.g., a browser instance) may instantiate its own isolated computing environment (e.g., sandboxed computing environment), firewall, and/or untrusted memory space. One or more plugins may be installed in a browser application that may enable the isolated computing environment, untrusted memory space, and/or use of the untrusted memory space. Additionally, one or more plugins may be installed in a browser application. The one or more plugins may enable one or more isolated computing environments and/or one or more internet isolation firewall(s) (e.g., to segregate the untrusted memory space(s)). The one or more plugins may be configured to enable one or more or any combination of the features described herein.

One or more instances of a browser application may operate on a host computer system. Each instance of the browser application may be supported by one or more respective browser processes. Each respective browser process may support one or more browser executables. The browser executable(s) may operate in the workspace. The browser executable(s) may operate within a sandboxed computing environment. The sandboxed computing environment may include resources (e.g., a limited set of resources) allocated for operation of one or more browser processes. The isolated computing environment (e.g., sandboxed computing environment) may be enforced via a browser process. The browser process may separate the sandboxed computing environment from other applications and/or processes that may be running on the workspace and/or any other memory space of the host computer system. The browser process may be configured to enable the browser executable(s) being executed within the sandboxed computing environment to access the resources allocated for operation of the browser process. For example, the browser executable(s) and/or plug-ins may be allowed to access memory associated with the sandboxed computing environment. The memory associated with the sandboxed computing environment may be separate from memory that is configured to enable storage and operation of the workspace and/or any other memory space.

The workspace may include one or more processes operating within the operating system that are not restricted by a browser process. The operating system of the host computer system may include a set of resources configured to enable operation of the workspace and one or more browser instance(s).

A browser instance may have access to one or more operating system and/or kernel processes in order to enforce isolation between the workspace associated with the trusted memory space and the sandboxed computing environment(s) associated with the untrusted memory space. The browser instance may enforce the segregation using techniques such as namespace isolation such that the browser executable(s) is restricted from accessing the trusted memory space including the workspace (e.g., and vice versa). The browser instance may restrict access to certain resources by the browser executable(s) running in the sandboxed computing environment. The browser instance may allow the workspace and the sandboxed computing environment(s) to share access to the host operating system and host operating resources (e.g., including the kernel and libraries) while enforcing the segregation of the memory spaces accessed by the workspace and the sandboxed computing environment(s). In this manner, the browser instance may permit isolation of the sandboxed computing environment(s) without requiring the sandboxed computing environment(s) to boot a separate operating system, load separate libraries, etc., which would require separate private memory for those files.

A browser application (e.g., a browser instance) may determine whether a network destination is trusted or untrusted. On a condition that the network destination is untrusted, the browser application may implement an isolated computing environment (e.g., sandboxed computing environment), for example, using an internal isolation firewall. The browser executable(s) operating within a sandboxed computing environment may be permitted to access untrusted network destinations and/or a predefined set of network destinations via an access connection device. For example, the browser application may enable a browser process executing in the sandboxed computing environment to communicate with the untrusted network destinations. The access connection device may be a web proxy, for example. The browser executable(s) operating within the sandboxed computing environment may connect to the untrusted network destinations as a dedicated network interface device with using a specific Internet Protocol (IP) address. A browser executable(s) operating within the sandboxed computing environment may be referred to as a sandboxed process or application.

Internet isolation may be provided via an internal isolation firewall which may be referred to as a sandbox firewall. The sandbox firewall may enable separation of the sandboxed computing environment from the workspace and/or any other memory space. The browser executable(s) operating within the sandboxed computing environment may be prevented from accessing any additional resources of the host computer system, for example, without explicit user action. For example, the sandbox firewall may generate a command prompt that enables a user selection if a browser executable(s) operating within the sandboxed computing environment is requesting access to resources outside of the sandbox memory space. By prompting the user to confirm that the browser executable(s) operating within the sandboxed computing environment is permitted to access additional resources outside the sandbox memory space, malware that is designed to attempt to remain transparent to the user may be limited to operation within the sandboxed computing environment. Thus, the malware within the sandboxed computing environment may be unable to access other resources available to the host computer system generally, such as local area networks and secure memory regions.

The sandbox firewall may allow certain actions to be performed with approval of the user of the host computer system. For example, a browser executable(s) operating within the sandboxed computing environment may be allowed access to the host system to perform one or more of a cut or copy of data, a paste of data, a printing of data to a local printer, a file transfer, and/or the like. The browser instance may prevent one or more other transfers of data between the sandboxed computing environment and the workspace or any other memory spaces except those user initiated actions described herein. For example, the browser instance may prevent unauthorized data transfers between the sandboxed computing environment and the workspace or any other memory spaces.

The browser application may include use of an authentication mechanism with an intermediate device. The intermediate device may be a proxy device (e.g., a web proxy), a termination device, an authorization device, another proxy device, and/or the like. The browser application may use an authentication scheme to connect with the intermediate device. The authentication scheme may use an encryption scheme as a means to obfuscate the authentication methods or credentials. The internet isolation system of the browser application may enable multiple authentication and/or encryption schemes.

The browser application may enable one or more authentication and/or encryption mechanisms. The browser application may utilize any combination of the one or more authentication and/or encryption mechanisms. For example, the browser application may use one combination of an authentication and encryption scheme to authenticate with an intermediate device. The browser application may be configured such that the authentication and/or encryption scheme can be selected based on one or more of the type of intermediate device, the network associated with the host computer system, the network associated with the intermediate device, a network destination, and/or the like. The browser application may receive configuration files associated with the host computer system. The configuration files may include authentication credentials (e.g., for authenticating with the intermediate device).

The browser application may maintain a list of untrusted network destinations and/or a list of trusted network destinations. The list of trusted network destinations may be a whitelist. The list of untrusted network destinations may be a blacklist. The browser application may be pre-configured with a whitelist and/or a blacklist. The whitelist and/or the blacklist (e.g., the pre-configured whitelist and/or pre-configured blacklist) may be modified by a user and/or an administrator. For example, the whitelist and/or the blacklist may be refined based on username and/or machine identification (ID). For example, the lists of trusted and untrusted network destinations may be different for different users and/or machines associated with a respective network. The whitelist and/or the blacklist may be associated with one or more access levels. For example, a first whitelist and a first blacklist may be assigned to a first access level. The browser application may be configured to determine whether a network destination is trusted or untrusted based on the whitelist and/or blacklist. The browser application may be configured to implement multiple isolated computing environments. For example, the browser application may implement a first isolated computing environment for communicating with a first subset of untrusted network destinations and a second isolated computing environment for communicating with a second subset of untrusted network destinations. The first subset and the second subset may be associated with different categories and/or risk levels.

An untrusted network destination may be an untrusted resource, an untrusted device, an untrusted website, and/or the like. Since the untrusted network destinations may be sources of malware, the browser application may be configured to enable communication with the untrusted network destination(s) via the sandboxed computing environment.

A browser instance may be configured to receive a request to access a network destination. The browser instance may determine whether the network destination is a trusted network destination, an untrusted network destination, or belongs to a predefined set of network destinations. For example, a browser instance and/or browser process may spawn a browser instance in the workspace to provide access to a trusted network destination. As another example, a browser instance and/or browser process may spawn a browser instance associated with a first sandboxed computing environment to provide access to an untrusted network destination. As another example, a browser instance and/or browser process may spawn a browser instance associated with a second sandboxed computing environment, that is different and distinct from the first sandbox environment, to provide access to a network destination that belongs to a predefined set of network destinations.

When the internet isolation system is implemented via a browser application and/or a browser application suite, the common software base may result in improved performance for the host computer system, improved interaction between the features of the internet isolation system, a simplified implementation, a simplified administration and/or configuration, a simplified licensing, a simplified support, and/or more secure communication between devices within the host computer system's network.

FIG. 1 illustrates an example of a host computer system that may implement one or more instances of one or more browser applications in a sandboxed environment. For example, a Host Computer System 10 may include one or more Processor(s) 12, Memory 14, one or more Input and/or Output (I/O) Devices 16, and one or more Network Interface Adapter(s) 18. Generally, the Host Computer System 10 may be any computing device capable of communicating over a network and/or performing processing tasks. Although the examples set forth herein may be described in terms general purpose computing workstations, the systems and methods disclosed herein may be equally applicable to any computing device or communication device for which internet isolation is desired. For example, the systems and methods disclosed herein may be applicable for providing sandbox based internet isolation for cell phones, pagers, personal computers (PCs), laptops, vehicles, kiosks, facilities, servers, workstations, tablets, smartphones, routers, controllers, microcontrollers, and/or any other processing and/or communication device.

Processor(s) 12 may include one or more of a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and/or the like. The Processor(s) 12 may perform data processing, input/output processing, instantiate operating system(s), execute application(s), and/or any other functionality that enables the use of sandbox isolation of one or more applications and/or processes.

Memory 14 may include volatile and/or non-volatile memory. Memory 14 may include read-only memory (ROM), random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs), and/or the like. Memory 14 may be configured to store computer readable instructions that when implemented by Processor(s) 12 may cause Processor(s) 12 to implement one or more of the functions or procedures described herein. For example, Memory 14 may be configured to store software code implemented by Processor(s) 12 that instantiate a restricted operating system environment for operation of the one or more instances of the one or more browser applications and/or other sandboxed applications(s) and/or process(es). The software may restrict sandbox-based access to one more file descriptors, memory, file system space, etc. For example, the browser application and/or process operating within the sandboxed computing environment may be permitted to certain portions of Memory 14 but may not be allowed access to other portions of Memory 14. As an example, Memory 14 may be partitioned into a first memory space and a second memory space. The first memory space may be configured to enable storage and/or operation of a workspace configured to execute a first set of one or more applications and/or processes running on the operating system of the Host Computer System 10. The second memory space may be configured to enable storage and/or operation of a second set of one or more applications and/or processes running within the sandboxed computing environment. The sandboxed computing environment may be enforced via a browser process. The browser process may segregate the workspace associated with the first memory space from the sandboxed computing environment associated with the second memory space. For example, the browser process may include an internal isolation firewall. The internal isolation firewall may enforce the segregation of the first and second memory spaces.

The Host Computer System 10 may include I/O Device(s) 16. The I/O Devices 16 may include one or more of a monitor, keyboard, mouse, touchscreen interface, digital camera, a digital display, a graphical user interface, and/or the like. The I/O Device(s) 16 can allow user interaction with the Host Computer System 10, for example to allow certain interactions between a browser application or process operating within the sandboxed computing environment and non-sandboxed resources.

The Network Interface Adapter(s) 18 may be configured to allow communication between the Host Computer System 10 and other devices. The Network Interface Adapter(s) 18 may include one or more wired and/or wireless communication devices.

The browser process may be configured to protect the host computer system from one or more malware toolsets. For example, the Network Interface Adapter(s) 18 may include one or more of a modem, Ethernet adapter, radio, wired and/or wireless transceiver, computer port, network socket, network interface controller, and/or the like. The Processor(s) 12 may maintain rules related to access to the Network Interface Adapter(s) 18 for both access via the sandboxed computing environment and via the workspace. Further, the Processor(s) 12 may enforce a host-based firewall that implements additional rules related to access to the Network Interface Adapter(s) 18.

As described herein, a browser application or process may be used for communicating with untrusted sources, such as Internet based resources. In this manner, if malware is transferred back to the host computer system due to interactions with the untrusted source, the malware may be isolated to the sandboxed computing environment, which may make it difficult for the malware to infect the workspace of the host computer system. For example, the browser process (e.g., the internal isolation firewall) may prevent the malware toolset from performing a reconnaissance of the host computer system to assess what data is available from the host computer system, such as computing resources, files, network information, additional network connectivity, etc. The browser process (e.g., the internal isolation firewall) may prevent the data on the host computer system from being reported back to the remote device that sent the malware to the host computer and/or any other remote devices.

The browser process may prevent the malware toolset from determining user system privileges of the host computer system, which can be used to access data on any associated network or local area network. For example, browser application and/or process operating within the sandboxed computing environment may not have access and/or authorization to such host computer configurations.

The browser process may prevent the malware toolset from accessing local files stored on the host computer system. For example, the browser process may isolate the first memory space from the second memory space. Such isolation may enable prevention of the malware from attempting to transmit such information back to the remote device that is the source of the malware. For example, the malware toolset may attempt to transmit a local security database from which additional user credentials can be derived, including potential privileged user credentials. These user credentials may be used by the malware to attempt to gain access to other resources on any associated network or the local area network. Where the user credentials are for a privileged user account, these credentials may be used to gain privileged access to other resources on any associated network or local area network.

The browser process may prevent the malware toolset from accessing a security token and/or hash of the host computer user from the memory of the host computer system and/or a network data stream. This security token or hash can be used to gain access to other resources on any associated network or the local area network. Where the security token or hash is for a privileged user account, this security token or hash may be used to gain privileged access to other resources on any associated network or local area network.

The browser process may prevent the malware toolset from enabling remote control and/or access of the host computer system by a remote device that is unknown to the user. When malware enables remote control and/or access, the remote device may be able to control one or more (e.g., all) operations of an infected host computer system and perform whatever alternative uses that an enslaved, infected host computer system can perform. For example, a remote device may download additional data to an infected host computer system, access other websites for denial of service attacks, and/or convert the infected host computer system into a source of malicious software from which toolsets or secondary payloads are downloaded to other, subsequently infected, host computer systems.

Figure 2:
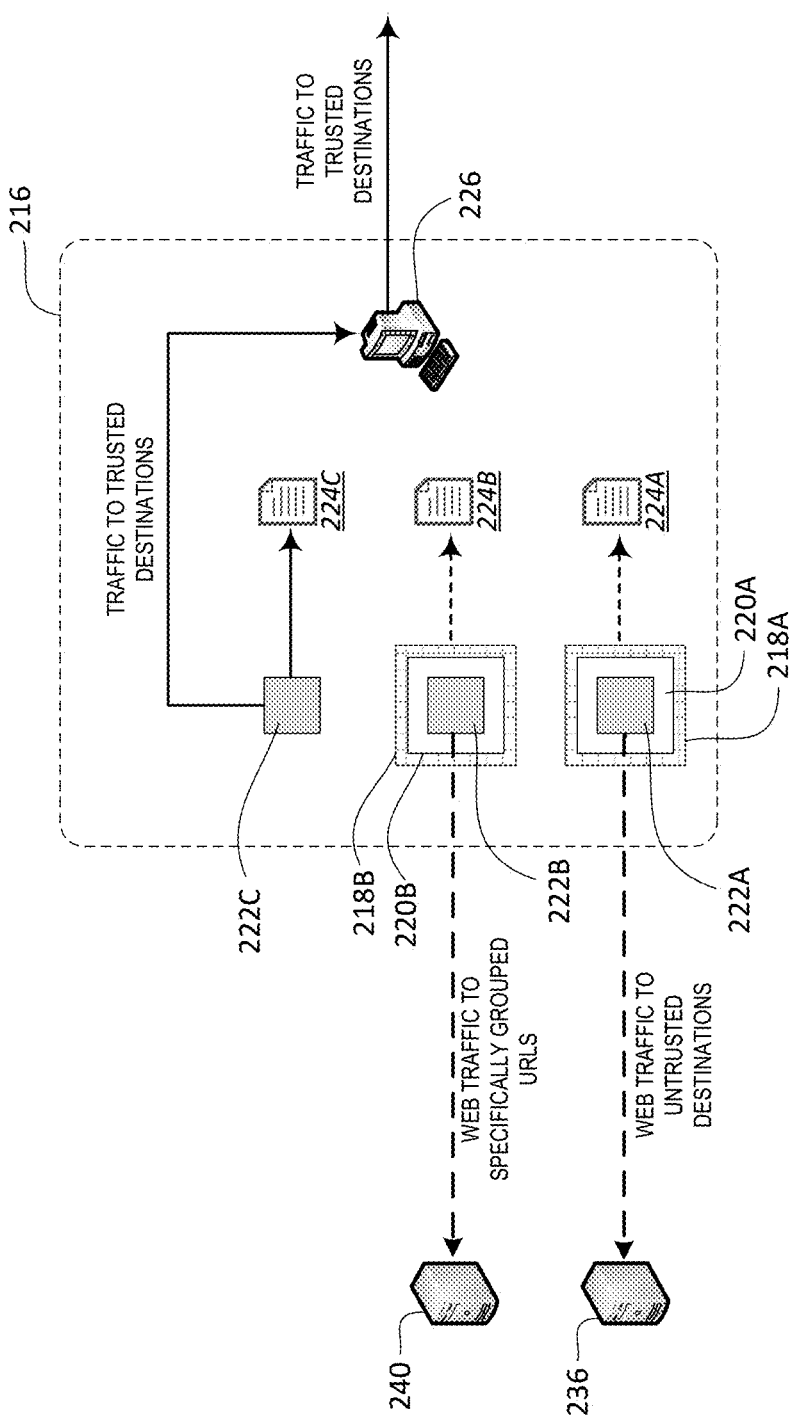
FIG. 2 depicts an example of multiple instances of a browser application implementing an internet isolation system.

FIG. 2 depicts an example of multiple instances of a browser application associated with an internet isolation system. A browser application may be installed on an operating system 226 of a host computer system. The browser application may be configured to enable an internet isolation system as described herein. The host computer system may be configured to be connected to a trusted network and/or an untrusted network. The host computer system may be any host computer system, such as a personal computer (PC), a laptop, a virtual machine, a desktop computer, a tablet, a mobile phone, a smartphone, and/or any of a variety of other host computer systems operatively connected with one or more user-accessible data entry devices, a display device viewable by a user, and a computer-accessible data storage. One or more application programs may run on the operating system 226.

As an example, the host computer system may be a PC, with 4 GB RAM and 146 GB hard disk computer-accessible storage, a monitor, a keyboard, and a mouse. The operating system 226 may be Windows-based, Linux-Based, Macintosh-based, and/or the like. The computer-accessible storage may store data corresponding to the software (e.g., computer-readable instructions) stored on the host computer system for common operation. Software programs may include word processing programs, accounting programs, remote connectivity programs, and/or other types of applications.

Multiple instances of the browser application may run at the same time. Each instance of the browser application may be supported by one or more respective browser processes. Each browser process may enable one or more browser executables associated with a browser instance (e.g., an instance of the browser application). Each browser instance may determine whether to enable a sandboxed computing environment. For example, each browser instance may determine whether to enable a sandboxed computing environment based on the network destination entered and/or selected. When an untrusted network destination is entered and/or selected, a browser instance may enable a sandboxed computing environment. When a network destination that belongs to a predefined set of network destinations is entered and/or selected, a browser instance may enable a sandboxed computing environment. When a trusted network destination is entered, a browser instance may not enable a sandboxed computing environment.

As shown in FIG. 2, a first browser executable(s) 222A may operate within a first sandboxed computing environment 220A. The first browser executable(s) 222A may be enabled by a first instance of the browser application (e.g., a first browser instance). A second browser executable(s) 222B may operate within a second sandboxed computing environment 220B. The second browser executable(s) 222B may be enabled by a second instance of the browser application (e.g., a second browser instance). A third browser executable(s) 222C may operate within a workspace 216 of the host computer system. The third browser executable(s) may be enabled by a third instance of the browser application (e.g., a third browser instance). The sandboxed computing environments 220A, 220B may be untrusted environments operating on the host computer system.

The first browser executable(s) 222A may send web traffic to one or more untrusted network destinations (e.g., untrusted URLs) via a first intermediate device 236 (e.g., such as a web proxy). For example, the first browser executable(s) 222A may access the untrusted network destinations and/or the Internet via the first intermediate device 236. The second browser executable(s) 222B may send web traffic to a predefined set of network destinations (e.g., a set of URLs) via a second intermediate device 240 (e.g., such as a web proxy, a destination device, etc.). For example, the second browser executable(s) 222B may access the set of URLs via the second intermediate device 240. The second browser executable(s) 222B may send web traffic to a predefined set of network destinations via the first intermediate device 236. For example, the second browser executable(s) 222B may access the set of URLs via the first intermediate device 236. The third browser executable(s) 222C may send traffic to one or more trusted destinations via the operating system 226 of the host computer system.

Each of the sandboxed computing environments 220A, 220B may include resources (e.g., a limited set of resources) allocated to the operation of respective browser processes and/or instances. For example, the first sandboxed computing environment 220A may be enforced via the first browser instance and the second sandboxed computing environment 220B may be enforced via the second browser instance. The first and second browser instances may run browser processes that may include one or more security mechanisms used to separate resources associated with the respective sandboxed computing environments 220A, 220B from other applications and/or processes that may be running on the workspace 216 or other memory spaces of the host computer system. The first and second browser instances may run browser processes that may include security mechanisms used to separate resources associated with the first sandboxed computing environment 220A and applications and/or processes that may be running within the second sandboxed computing environment 220B (e.g., and vice versa). The browser instances may be configured to enable the respective browser executable(s) 222A, 222B being executed within the respective sandboxed computing environments 220A, 220B to access the resources allocated for operation of the browser instances. For example, the first browser executable(s) 222A being operated within the first sandboxed computing environment 220A may be allowed to access memory associated with the first sandboxed computing environment 220A and the second browser executable(s) 222B being operated within the second sandboxed computing environment 220B may be allowed to access memory associated with the second sandboxed computing environment 220B. The memory associated with the first sandboxed computing environment 220A may be separate from memory that is configured to enable storage and operation of the workspace 216. The memory associated with the second sandboxed computing environment 220B may be separate from the memory that is configured to enable storage and operation of the workspace 216. The memory associated with the first sandboxed computing environment 220A may be separate from memory that is configured to enable storage and operation of the second sandboxed computing environment 220B.

The workspace 216 may include one or more processes operating within the operating system 226 that are not restricted by the first and second browser instances. The operating system 226 of the host computer system may include a set of resources configured to enable operation of the workspace 216, the first browser instance, the second browser instance, and/or the third browser instance.

The first browser instance may enable the first sandboxed computing environment 220A and the second browser instance may enable the second sandboxed computing environment 220B. A first memory space may be configured to enable storage and operation of the workspace 216 configured to execute a first set of one or more applications and/or processes running on the operating system 226 of the host computer system 212. For example, the third browser executable(s) 222C may operate within the first memory space. A second memory space, configured to enable storage and operation of a set of one or more applications and/or processes operating within the first sandboxed computing environment 220A, may be prohibited from communicating with other resources within a trusted network. A third memory space, configured to enable storage and operation of a set of one or more applications and/or processes operating within the second sandboxed computing environment 220B, may be prohibited from communicating with other resources within a trusted network. The first browser executable(s) 222A (e.g., a sandboxed browser executable) may run within the first sandboxed computing environment 220A. The sandboxed browser executable(s) 222A may be configured to enable access to one or more untrusted network destinations. A second browser executable(s) 222B (e.g., a sandboxed browser executable) may run within the second sandboxed computing environment 220B. The second sandboxed browser executable(s) 222B may be configured to enable access to a predefined set of network destinations. The predefined set of network destinations may include one or more untrusted URLs. The predefined set of network destinations may be configured based on the user, an enterprise associated with the user, an access level associated with the user, and/or the like.

The third browser executable(s) 222C running within the workspace 216 may enable access to one or more trusted network destinations. For example, the third browser executable(s) running within the workspace 216 of the host computer system may enable access to the trusted network destinations.

The sandboxed computing environments 220A, 220B and/or the browser instances may be implemented using software, a software plug-in, and/or hardware. For example, the sandboxed computing environments 220A, 220B and/or the browser instances may be implemented using software that is commercially available, for example, such as Chrome, Firefox, Safari, Internet Explorer, etc. As another example, the sandboxed computing environments 220A, 220B and/or the browser instances may be implemented using a software plug-in configured to be installed within software that is commercially available, for example, such as Chrome, Firefox, Safari, Internet Explorer, etc.

The first browser instance may segregate the workspace 216 from the first sandboxed computing environment 220A. The first memory space (e.g., the workspace memory) may enable storage and/or operation of the workspace 216. The operating system 226 may enable operation of the first sandboxed computing environment 220A. The second memory space may enable storage and/or operation of the first sandboxed browser executable(s) 222A within the first sandboxed computing environment 220A. For example, the second memory space may be reserved for storage and/or operation of the first sandboxed browser executable(s) 222A (e.g., and associated processes) running within the first sandboxed computing environment 220A. The first browser instance may isolate the second memory space from the first memory space, the third memory space, and/or any other memory spaces. For example, the first browser instance may enable a first internal isolation firewall 218A. The first internal isolation firewall 218A may enforce a separation of the first and second memory spaces. For example, the first internal isolation firewall 218A may allow a predefined set of processes to be executed within the first sandboxed computing environment 220A. The first internal isolation firewall 218A may prevent execution, in the first sandboxed computing environment 220A, of any processes outside of the predefined set of processes. The second memory space may be referred to as a separate and/or isolated memory space. Separation and/or isolation of computer resources may be referred to as a virtual air gapped solution. The first memory space and the second memory space may be separate physical memory locations. The first memory space and the second memory space may be collocated on a physical memory.

A third memory space may enable storage and/or operation of the second sandboxed browser executable(s) 222B within the second sandboxed computing environment 220B. For example, the third memory space may be reserved for storage and/or operation of the second sandboxed browser executable(s) 222B (e.g., and associated processes) running within the second sandboxed computing environment 220B. The second browser instance may isolate the third memory space from the first memory space and/or any other memory spaces (e.g., the second memory space). For example, the second browser instance may enable the second internal isolation firewall 218B. The second internal isolation firewall 218B may enforce a separation of the third memory space and any other memory spaces. For example, the second internal isolation firewall 218B may allow a predefined set of processes to be executed within the second sandboxed computing environment 220B. The second internal isolation firewall 218B may prevent execution, in the second sandboxed computing environment 220B, of any processes outside of the predefined set of processes. The third memory space may be referred to as a separate and/or isolated memory space. Separation and/or isolation of computer resources may be referred to as a virtual air gapped solution. The first, second, and/or third memory spaces may be separate physical memory locations. The first, second, and/or third memory spaces may be collocated on a physical memory.

The second and third memory spaces and the respective browser processes therein, may have limited access to the resources, assets, and/or files of the remainder of the computer-accessible data storage or memory space of the host computer system 212. Data transfers between the sandboxed computing environments 220A, 220B and the workspace 216 may be restricted to set transfer types. Data transfers between the sandboxed computing environments 220A, 220B may be restricted to set transfer types. The set transfer types may be configured to minimize the possibility of malicious data migrating between the sandboxed computing environments 220A, 220B and/or to/from the sandboxed computing environments 220A, 220B to the workspace 216. The first sandboxed computing environment 220A may enable transfer (e.g., only enable transfer) of data (e.g., such as document 224A) to or from the workspace 216 in response to a user input directing the data transfer. The second sandboxed computing environment 220B may enable transfer (e.g., only enable transfer) of data (e.g., such as document 224B) to or from the workspace 216 in response to a user input directing the data transfer. The browser executable(s) 222C may be configured to enable transfer of data (e.g., such as document 224C) to or from the workspace 216 (e.g., without user input). The user input may be an explicit user input such as checking a box and/or selecting a button on an information prompt. The set transfer types that require user input may include one or more manual operations. For example, the set transfer types may include cut or copy of data, paste of data, a printing of data to a local printer, or a file transfer.

The operating system 226 may access (e.g., only access) the second memory space associated with the first sandboxed computing environment 220A and/or the third memory space associated with the second sandboxed computing environment 220B as required for the proper operation of each respective sandboxed computing environment. Each of the internal isolation firewalls 218A, 218B may be built-in with the respective sandboxed computing environments 220A, 220B.

The first sandboxed computing environment 220A, when activated, may enable communication (e.g., indirect communication) between the host computer system and an untrusted network destination via the first intermediate device 236. The first sandboxed computing environment 220A may be activated via a desktop short cut associated with the browser application.

As an example, a browser application short cut located on the user's desktop space, the desktop toolbar, and/or the standard program Start screen may be activated, for example, by a user selection. The selection of the browser application short cut may enable activation of the first sandboxed browser executable(s) 222A and the first browser instance. When the first browser instance is activated, the first browser instance may terminate one or more running browser program processes and/or may activate the first sandboxed browser executable(s) 222A within the first sandboxed computing environment 220A, as described herein.

The first sandboxed browser executable(s) 222A, when activated by the first browser instance, may initiate a communication session to the first intermediate device 236. For example, the communication session may be initiated utilizing an encrypted protocol on a predetermined network port. During the initiation of the communication session, the first browser instance may validate the authenticity of a browser process request for the communication session. The first browser instance may authenticate the first sandboxed browser executable(s) 222A using an authentication mechanism with the first intermediate device 236. If the first browser instance request fails authentication, the communication session may be terminated, for example, by the first intermediate device 236.

The first browser instance may initiate a communication session with the first intermediate device 236 using an authentication mechanism. For example, the authentication procedure may use a predetermined protocol and may communicate with the first intermediate device 236 using a predetermined communication port. As another example, the authentication procedure may be performed dynamically. For example, the authentication procedure used may depend on the network that the host computer system is connected and/or the network that the first intermediate device 236 is connected. As an example, the first browser instance may initiate the first browser executable(s) 222A and the communication session with the first intermediate device 236 using NT LAN Manager (NTLM) protocols and the predetermined network port 2222. As another example, the first browser instance may initiate the communication session with the first intermediate device 236 using a Secure Socket Layer (SSL) and the predetermined network port 2222. As part of the communication session, the first browser instance may send validation credentials to the first intermediate device 236, for example, using a predetermined authentication mechanism. The predetermined authentication mechanism may be a username/password combination. The username/password combination may be encrypted, for example, with an asymmetric or a symmetric encryption key system. The first intermediate device 236 may be the only device able to decrypt the username/password combination.

The first browser instance may be configured to authenticate with the first intermediate device 236. For example, the first browser instance may authenticate with the first intermediate device 236 on behalf of the first browser executable(s) 222A. The first browser instance may authenticate with the first intermediate device 236 using credentials stored in a configuration file. The configuration file may be encrypted. For example, the first browser instance may be configured to read only encrypted configuration files.

Upon successful creation of a communication session between the first browser instance and the first intermediate device 236, the first intermediate device 236 may analyze and/or validate the request to communicate with the untrusted network destination. If the request to communicate with the untrusted network destination is permitted, the first intermediate device 236 may act as an intermediary communication point between the first browser executable(s) 222A and the untrusted network destination.

The second browser executable(s) 222B, when activated by the second browser instance, may initiate a communication session with the second intermediate device 240. For example, the communication session may be initiated utilizing an encrypted protocol on a predetermined network port. During the initiation of the communication session, the second browser instance may validate the authenticity of a browser process request for the communication session. The second browser instance may authenticate the second sandbox browser executable(s) 222B using an authentication mechanism with the second intermediate device 240. If the second browser instance request fails authentication, the communication session may be terminated, for example, by the second intermediate device 240.

The second browser instance may initiate a communication session with the second intermediate device 240 using and authentication mechanism. For example, the authentication procedure may use a predetermined protocol and may communicate with the second intermediate device 240 using a predetermined communication port. As another example, the authentication procedure may be performed dynamically. For example, the authentication procedure used may depend on the network that the host computer system is connected and/or the network that the second intermediate device 240 is connected. As an example, the second browser instance may initiate the second browser executable(s) 222B and the communication session with the second intermediate device 240 using NT LAN Manager (NTLM) protocols and the predetermined network port 3333. As another example, the second browser instance may initiate the communication session with the second intermediate device 240 using a Secure Socket Layer (SSL) and the predetermined network port 3333. As part of the communication session, the second browser instance may send validation credentials to the second intermediate device 240, for example, using a predetermined authentication mechanism. The predetermined authentication mechanism may be a username/password combination. The username/password combination may be encrypted, for example, with an asymmetric or a symmetric encryption key system. The second intermediate device 240 may be the only device able to decrypt the username/password combination.

The second browser instance may be configured to authenticate with the second intermediate device 240. For example, the second browser process may authenticate with the second intermediate device 240 on behalf of the second browser executable(s) 222B. The second browser process may authenticate with the second intermediate device 240 using credentials stored in a configuration file. The configuration file may be encrypted. For example, the second browser process may be configured to read only encrypted configuration files.

Upon successful creation of a communication session between the second browser instance and the second intermediate device 240, the second intermediate device 240 may analyze and/or validate the request to communicate with a network destination belonging to a predefined of network destinations. If the request to communicate with the network destination belonging to a predefined set of network destinations is permitted, the second intermediate device 240 may act as an intermediary communication point between the second sandboxed browser executable(s) 222B and the network destination belonging to a predefined set of network destinations.

The first and second browser instances may be configured to initiate a communication session with the first intermediate device 236 and/or the second intermediate device 240. For example, the first browser executable(s) 222A and the second browser executable(s) 222B may communicate with the first intermediate device 236. For example, the first browser executable(s) 222A and the second browser executable(s) 222B may communicate with the second intermediate device 240. For example, the first browser executable(s) may communicate with the first intermediate device 236 and the second browser executable(s) 222B may communicate with the second intermediate device 240. For example, the first browser executable(s) may communicate with the second intermediate device 240 and the second browser executable(s) 222B may communicate with the first intermediate device 236

The first and second browser instances may be configured to initiate a communication session with an intermediate device using a predetermined network port. For example, the first browser executable(s) 222A and the second browser executable(s) 222B may communicate with the intermediate device using network port 2222. For example, the first browser executable(s) 222A and the second browser executable(s) 222B may communicate with the intermediate device using network port 3333. For example, the first browser executable(s) may communicate with the intermediate device using network port 2222 and the second browser executable(s) 222B may communicate with the intermediate using network port 3333. For example, the first browser executable(s) may communicate with the intermediate device using network port 3333 and the second browser executable(s) 222B may communicate with the intermediate device using network port 2222.

The first and second browser instances may be configured to initiate a communication session with one or more intermediate devices using one or more specified network ports. The intermediate device(s), specified network port(s), and/or credentials used for communication with multiple browser instances (e.g., the first and/or second browser instance) may be the same, different, or any combination thereof as required to create the internet isolation system.

A user may initiate a browser instance and may enter and/or select a network destination. A browser instance may be initiated in the workspace 216, the first sandboxed computing environment 220A, or the second sandboxed computing environment 220B. The browser instance may determine whether the network destination is trusted, untrusted, and/or is a network destination belonging to a predefined set of network destinations. The browser instance may provide access to a trusted network destination via the third browser executable(s) 222C initiated in the workspace 216. The browser instance may provide access to an untrusted network destination via the first browser executable(s) 222A executed in the first sandboxed computing environment 220A. For example, the browser instance may be configured to spawn an instance of the browser application (e.g., the first browser executable(s) 222A) in the first sandboxed computing environment 220A to provide access to the untrusted network destination. The browser instance may provide access to the set of predefined network destinations via the second browser executable(s) 222B executed in the second sandboxed computing environment 220B. For example, the browser instance may be configured to spawn an instance of the browser application (e.g., the second browser executable(s) 222B) in the second sandboxed computing environment 220B to provide access to the set of predefined network destinations.

As an example, the third browser instance may determine that a browser process (e.g., the third browser executable(s) 222C) operating in the workspace 216 is attempting to access an untrusted network destination. The third browser instance may spawn the first browser executable(s) 222A in the first sandboxed computing environment 220A to provide access to the untrusted network destination. As an example, the third browser instance may determine that the third browser executable(s) 222C operating in the workspace 216 is attempting to access a trusted network destination. The third browser instance may allow the third browser executable(s) 222C operating in the workspace 216 to access the trusted network destination. As another example, the third browser instance may determine that the browser process (e.g., the third browser executable(s) 222C) operating in the workspace 216 is attempting to access a network destination belonging to a predefined set of network destinations. The third browser instance may spawn the second browser executable(s) 222B in the second sandboxed computing environment 220B to provide access to the network destination belonging to a predefined set of network destinations.

As another example, the first browser instance may determine that the first browser executable(s) 222A operating in the first sandboxed computing environment 220A is attempting to access an untrusted network destination. The first browser instance may allow the first browser executable(s) 222A operating in the first sandboxed computing environment 220A to access the untrusted network destination. As another example, the first browser instance may determine that the first browser executable(s) 222A operating in the first sandboxed computing environment 220A is attempting to access a trusted network destination. The first browser instance may spawn the third browser executable(s) 222C in the workspace 216 to provide access to the trusted network destination. As another example, the first browser instance may determine that the first browser executable(s) 222A operating in the first sandboxed computing environment 220A is attempting to access a network destination belonging to a predefined set of network destinations. The first browser instance may spawn the second browser executable(s) 222B in the second sandboxed computing environment 220B to provide access to the network destination belonging to a predefined set of network destinations.

As a further example, the second browser instance may determine that the second browser executable(s) 222B operating in the second sandboxed computing environment 220B is attempting to access a network destination belonging to a predefined set of network destinations. The second browser instance may allow the second browser executable(s) 222B operating in the second sandboxed computing environment 220B to access the network destination belonging to a predefined set of network destinations. As another example, the second browser instance may determine that the second browser executable(s) 222B operating in the second sandboxed computing environment 220B is attempting to access a trusted network destination. The second browser instance may spawn the third browser executable(s) 222C in the workspace 216 to provide access to the trusted network destination. As another example, the second browser instance may determine that the second browser executable(s) 222B operating in the second sandboxed computing environment 220B is attempting to access an untrusted network destination. The second browser instance may spawn the first browser executable(s) 222A in the first sandboxed computing environment 220A to provide access to the untrusted network destination.

The first sandboxed computing environment 220A and/or the second sandboxed computing environment 220B may receive malware from an untrusted network device. For example, the untrusted network device may send malware (e.g., malicious software) to the first sandboxed computing environment 220A or the second sandboxed computing environment 220B. The malware may be executed within the respective sandboxed computing environment. The executed malware may start one or more processes, download one or more payloads, and/or execute the one or more payloads. The processes and/or payloads may be executed within the respective sandboxed computing environment, for example, instead of on the workspace 216 of the operating system 226. The first and/or second sandboxed computing environments 220A, 220B may be considered infected when they have received malware.

Even when the first sandboxed computing environment 220A and/or the second sandboxed computing environment 220B are infected, the use of the sandbox based internet isolation may allow the workspace 216 to be considered to be uninfected and trusted. The workspace 216 may be considered uninfected and trusted because the memory spaces of the first sandboxed computing environment 220A (e.g., the second memory space) and the second sandboxed computing environment 220B (e.g., the third memory space) and the processes operating therein may be separated and isolated from the memory space for the workspace 216 (e.g., the first memory space) of the host computer system 212. The introduced malware may not be able to access the resources, assets, and/or files of the operating system 226. For example, the first and/or second internal isolation firewalls 218A, 218B may prevent the introduced malware from accessing the resources, assets, and/or files of the operating system 226.

A sandboxed computing environment (e.g., such as sandboxed computing environments 220A, 220B) that becomes infected and/or untrusted may encounter problems. The browser instance associated with the infected sandboxed computing environment may become inoperable, for example, due to the introduced malware. An infected browser instance may restore a pristine copy (e.g., a "clean slate") of the sandboxed computing environment processes and/or its separated and isolated memory space. An infected sandboxed computing environment may be cleared (e.g., immediately) and reverted to its original, trusted condition. For example, one or more (e.g., all) aspects of the introduced malware may be removed from the infected sandboxed computing environment without any harm to the operating system 226. The browser instance may initiate a "clean slate" periodically, e.g., once a day, once every 12 hours, once an hour, etc. The browser instance may initiate a "clean slate" on demand, e.g., based on an indication and/or input received from the user of the host computer system. The "clean slate" may be initiated using a restore capability of the browser instance and/or the associated browser application.

The browser executable(s) 222A, 222B, 222C may maintain a list of untrusted network destinations and/or a list of trusted network destinations. The list of trusted network destinations may be a whitelist. The list of untrusted network destinations may be a blacklist. The browser executable(s) 222A, 222B, 222C may be pre-configured with a whitelist and/or a blacklist. The whitelist and/or the blacklist (e.g., the pre-configured whitelist and/or pre-configured blacklist) may be modified by a user and/or an administrator. For example, the whitelist and/or the blacklist may be refined based on username and/or machine identification (ID). For example, the lists of trusted and untrusted network destinations may be different for different users and/or machines associated with a respective network. The whitelist and/or the blacklist may be associated with one or more access levels. For example, a first whitelist and a first blacklist may be assigned to a first access level.

The browser executable(s) 222A, 222B, 222C may be configured to monitor and/or categorize browser connection requests. The browser executable(s) 222A, 222B, 222C may be configured to categorize browser connection requests as trusted, untrusted, or some other similar acceptance hierarchy. For example, the browser executable(s) 222A, 222B, 222C may be configured to categorize browser connection requests based on local area network (LAN) internal, LAN external, network destination belonging to a predefined set of network destinations, predefined URL belonging to a predefined set of URLs, etc.

Figure 3:
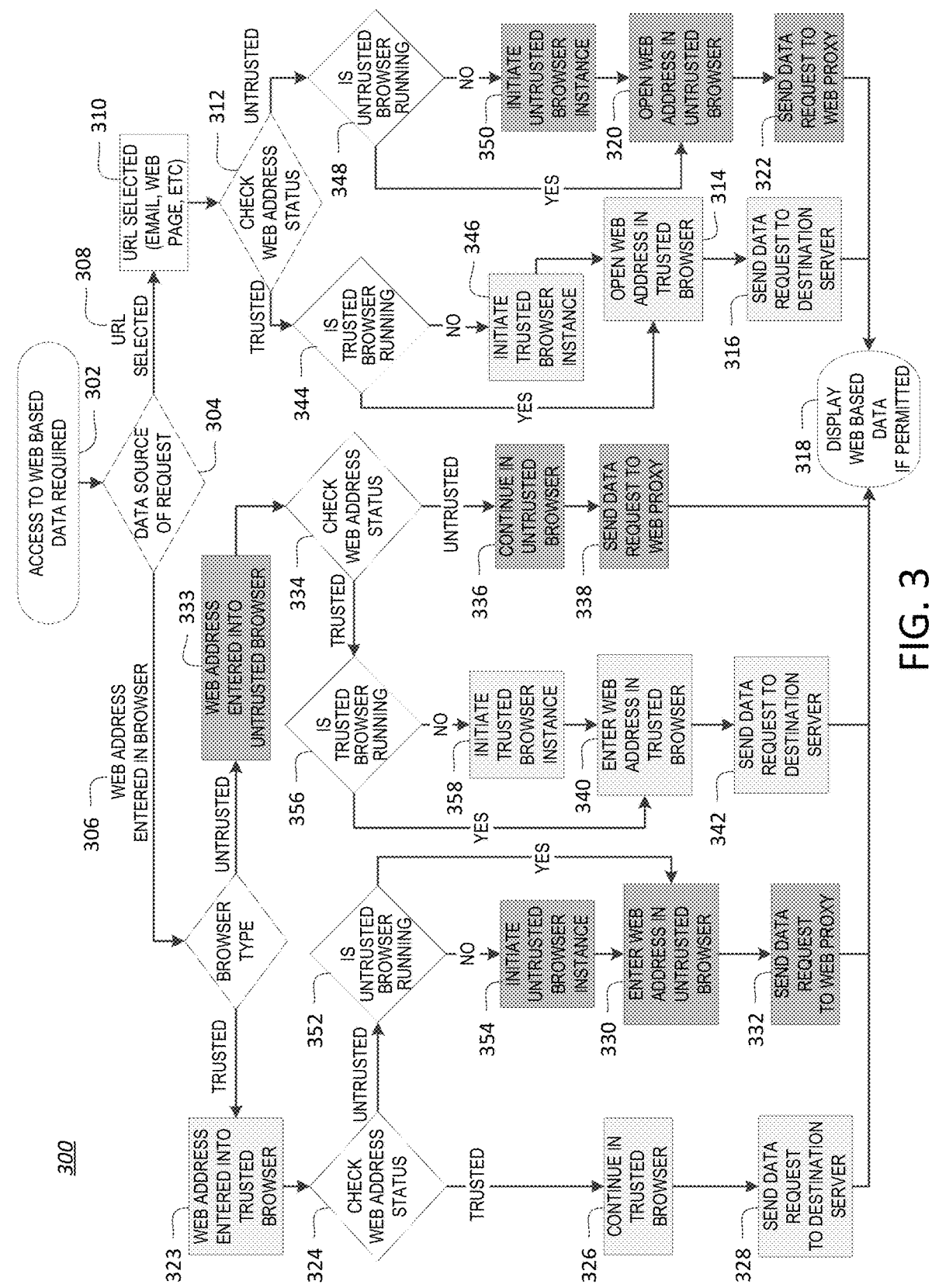
FIG. 3 depicts an example of browser instance switching based on the network destination

FIG. 3 depicts an example browser instance switching 300 based on the network destination. The example browser instance switching 300 may be implemented by a host computer system, for example, a browser application operating on the host computer system. At 302, a browser instance may determine that access to web based data is required. At 304, the browser instance may determine whether the data source of the request is a web address entered in a browser 306 or a URL selection 308. At 310, the browser instance may determine that a URL has been selected, for example, via an email, a web page, and/or the like. At 312, the browser instance may determine whether the network destination (e.g., web address) is a trusted or untrusted network destination.

If the network destination is trusted, the browser instance may determine, at 344, whether a trusted browser executable(s) is running in the workspace. If a trusted browser executable(s) is running in the workspace, the browser instance may open, at 314, the web address in the trusted browser executable(s) running in the workspace. If a trusted browser executable(s) is not running in the workspace, the browser instance may initiate, at 346, a trusted browser executable(s) in the workspace. For example, the browser instance may spawn a trusted browser executable(s) in the workspace to access the selected web address. The selected web address may be opened in a new tab of the trusted browser executable(s). The new tab in the trusted browser executable (e.g., application) may be configured to enable communication with one or more trusted network destinations. At 316, the trusted browser may send a data request to a destination server. At 318, the trusted browser application may display web based data (e.g., if permitted).

If the network destination is untrusted, the browser instance may determine, at 348, whether an untrusted browser executable(s) is running in a sandboxed computing environment. If an untrusted browser executable(s) is running in a sandboxed computing environment, the browser instance may open, at 320, the web address in the untrusted browser executable(s) running in the sandboxed computing environment. If an untrusted browser executable(s) is not running, the browser instance may initiate, at 350, an untrusted browser executable(s) in a sandboxed computing environment. For example, the browser instance may spawn an untrusted browser instance in a sandboxed computing environment to access the selected web address. The selected web address may be opened in a new tab of the untrusted sandbox browser instance. The new tab in the untrusted sandbox browser instance may be configured to enable communication with one or more untrusted network destinations. At 322, the untrusted sandbox browser executable(s) may send a data request to a web proxy.

The browser instance may, at 323, determine that the data source of the request is a web address entered into a trusted browser instance. If the web address was entered into a trusted browser instance operating within the workspace, the browser instance may, at 324, determine whether the web address is a trusted or untrusted network destination. If the web address is a trusted network destination, the browser instance may continue, at 326, in the trusted browser instance. For example, the trusted browser instance may send, at 328, a data request to a destination server associated with the web address. If the web address is an untrusted network destination, the browser instance may determine, at 352, whether an untrusted sandboxed browser executable(s) is running in a sandboxed computing environment. If an untrusted sandboxed browser executable(s) is running in a sandboxed computing environment, the browser instance may open, at 330, the web address in the untrusted sandboxed browser executable(s) running in the sandboxed computing environment. If an untrusted sandboxed browser executable(s) is not running, the browser instance may initiate, at 354, an untrusted sandbox browser instance in a sandboxed computing environment. For example, the browser instance may spawn an untrusted sandboxed browser executable(s) in a sandboxed computing environment to access the selected web address. The selected web address may be opened in a new tab of the untrusted sandboxed browser executable(s). At 332, the untrusted sandboxed browser executable(s) may send a data request to a web proxy.

The browser instance may, at 333, determine that the data source of the request is a web address entered into an untrusted sandboxed browser executable(s). If the web address was entered into an untrusted sandboxed browser executable(s) operating within the sandboxed computing environment, the browser instance may, at 334, determine whether the web address is a trusted or untrusted network destination. If the web address is an untrusted network destination, the browser instance may continue, at 336, in the untrusted sandboxed browser executable(s). For example, the untrusted sandboxed browser executable(s) may send, at 338, a data request to a web proxy. If the web address is a trusted network destination, the browser instance may determine, at 356, whether a trusted browser executable(s) is running in the workspace. If a trusted browser executable(s) is running in the workspace, the browser instance may open, at 340, the web address in the trusted browser executable(s) running in the workspace. If a trusted browser executable(s) is not running, the browser instance may initiate, at 358, a trusted browser executable(s) in the workspace and may provide access to the trusted network destination via the initiated trusted browser executable(s). For example, the browser process may spawn a trusted browser executable(s) in the workspace. The web address may be opened in a new tab of the trusted browser executable(s). The trusted browser executable(s) may send, at 342, a data request to a destination server associated with the web address.

The terms used herein should be seen to be terms of description rather than of limitation. It is understood that those of skill in the art with this disclosure may devise alternatives, modifications, or variations of the principles of the invention. It is intended that all such alternatives, modifications, or variations be considered as within the spirit and scope of this invention, as defined by the following claims.

Embodiments may take the form of a tangible computer-usable or computer-readable medium providing program code for use by or in connection with a computer or any instruction execution system. Examples of a computer-usable or computer-readable medium include tangible computer media such as semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A processor may be configured to execute instructions stored in memory to perform the various functions and/or functional modules described herein.

What is claimed:

1. A host computer system configured to connect to a network, the host computer system comprising:
   a memory; and
   a processor configured to:
   receive a first request and a second request from a first browser application, wherein the first browser application executes in a workspace, wherein the workspace has access to a host operating system and a system kernel, and wherein the workspace uses a first memory space;
   determine that the first request is a request to communicate with an untrusted network destination and that the second request is a request to communicate with a trusted network destination;
   determine a risk level associated with the untrusted network destination and a firewall configuration associated with the determined risk level;
   in response to the determined risk level and the first request from the first browser application, execute a second browser application in an isolated computing environment and configure an internal isolation firewall according to the determined firewall configuration, wherein the isolated computing environment comprises a sandboxed computing environment enforced by a sandbox container process that uses the internal isolation firewall, wherein the isolated computing environment has access to the host operating system and uses a second memory space, and wherein the second memory space is separate from the first memory space;

isolate the second browser application from the workspace using the internal isolation firewall, wherein the internal isolation firewall is configured according to the determined firewall configuration, and wherein the internal isolation firewall prevents data from being communicated between the second browser application and the workspace;

send first data from the second browser application in the isolated computing environment to the untrusted network destination; and send second data from the first browser application to the trusted network destination.

2. The host computer system of claim 1, wherein the isolated computing environment is isolated from the workspace.

3. The host computer system of claim 1, wherein the second browser application is implemented via a browser application plug-in.

4. The host computer system of claim 1, wherein the first browser application is configured to receive configuration files associated with the host computer system, wherein the configuration files comprise one or more of a whitelist, a blacklist, or authentication credentials, wherein the whitelist comprises a list of trusted network destinations, and wherein the blacklist comprises a list of untrusted network destinations.

5. The host computer system of claim 1, wherein the processor is further configured to:
determine the untrusted network destination using one or more of a whitelist comprising a list of trusted network destinations or a blacklist comprising a list of untrusted network destinations.

6. The host computer system of claim 1, wherein the second browser application is configured to authenticate, using an authentication credential in a configuration file, with an authorization device to communicate with the untrusted network destination.

7. The host computer system of claim 1, wherein the second browser application is configured to communicate with the untrusted network destination via a proxy device.

8. The host computer system of claim 1, wherein the risk level is a first risk level, wherein the untrusted network destination is a first untrusted network destination, wherein the sandboxed computing environment is a first sandboxed computing environment, and the second browser application configured to run in the first sandboxed computing environment and a second sandboxed computing environment, and wherein the first sandboxed computing environment is configured to communicate with the first untrusted network destination associated with one or more of a first category or the first risk level, and the second sandboxed computing environment is configured to communicate with a second untrusted network destination associated with one or more of a second category or a second risk level.

9. The host computer system of claim 1, wherein the first browser application is associated with a first tab and the first tab is configured to communicate with a trusted network destination, and wherein the second browser application is associated with a second tab and the second tab is configured to communicate with the untrusted network destination.

10. A method comprising:
receiving a first request and a second request from a first browser application wherein the first browser application executes in a workspace, wherein the workspace has access to a host operating system and a system kernel, and wherein the workspace uses a first memory space;

determining that the first request is a request to communicate with an untrusted network destination and that the second request is a request to communicate with a trusted network destination;

determining a risk level associated with the untrusted network destination and a firewall configuration associated with the determined risk level;

in response to the determined risk level and the first request from the first browser application, executing a second browser application in an isolated computing environment and configuring an internal isolation firewall according to the determined firewall configuration, wherein the isolated computing environment comprises a sandboxed computing environment enforced by a sandbox container process that uses the internal isolation firewall, wherein the isolated computing environment has access to the host operating system and uses a second memory space, and wherein the second memory space is separate from the first memory space;

isolating the second browser application from the workspace using the internal isolation firewall, wherein the internal isolation firewall is configured according to the determined firewall configuration, and wherein the internal isolation firewall prevents data from being communicated between the second browser application and the workspace;

sending first data from the second browser application in the isolated computing environment to the untrusted network destination; and sending second data from the first browser application to the trusted network destination.

11. The method of claim 10, wherein the isolated computing environment is isolated from the workspace.

12. The method of claim 10, wherein the second browser application is configured is implemented via a browser application plug-in.

13. The method of claim 10, further comprising:
receiving, by the first browser application, configuration files associated with a host computer system, wherein the configuration files comprise one or more of a whitelist, a blacklist, or authentication credentials, and wherein the whitelist comprises a list of trusted network destinations and the blacklist comprises a list of untrusted network destinations.

14. The method of claim 10, further comprising:
determining the untrusted network destination using one or more of a whitelist comprising a list of trusted network destinations or a blacklist comprising a list of untrusted network destinations.

15. The method of claim 10, further comprising:
authenticating, by the second browser application, with an authorization device to communicate with the untrusted network destination using an authentication credential in a configuration file.

16. The method of claim 10, wherein the second browser application is configured to communicate with the untrusted network destination via a proxy device.

17. The method of claim 10, wherein the risk level is a first risk level, wherein the untrusted network destination is a first untrusted network destination, wherein the sandboxed computing environment is a first sandboxed computing environment, and the second browser application configured to run in the first sandboxed computing environment and a second sandboxed computing environment, and wherein the first sandboxed computing environment is configured to communicate with the first -untrusted network destination associated with one or more of a first category or the first risk level, and the second sandboxed computing environment is configured to communicate with a second untrusted network destination associated with one or more of a second category or a second risk level.

18. The method of claim 10, wherein the first browser application is associated with a first tab and the first tab is configured to communicate with a trusted network destination, and wherein the second browser application is associated with a second tab and the second tab is configured to communicate with the untrusted network destination.

19. A non-transitory computer readable storage medium encoded with instructions capable of being executed by a processor, wherein when executing the instructions, the processor is configured to implement a method comprising:
   receiving a first request and a second request from a first browser application, wherein the first browser application executes in a workspace, wherein the workspace has access to a host operating system and a system kernel, and wherein the workspace uses a first memory space;
   determining that the first request is a request to communicate with an untrusted network destination and that the second request is a request to communicate with a trusted network destination;
   determining a risk level associated with the untrusted network destination and a firewall configuration associated with the determined risk level;
   in response to the determined risk level and the first request from the first browser application, executing a second browser application in an isolated computing environment and configuring an internal isolation firewall according to the determined firewall configuration, wherein the isolated computing environment comprises a sandboxed computing environment enforced by a sandbox container process that uses the internal isolation firewall, wherein the isolated computing environment has access to the host operating system and uses a second memory space, and wherein the second memory space is separate from the first memory space;
   isolating the second browser application from the workspace using the internal isolation firewall, wherein the internal isolation firewall is configured according to the determined firewall configuration, and wherein the internal isolation firewall prevents data from being communicated between the second browser application and the workspace;
   sending first data from the second browser application in the isolated computing environment to the untrusted network destination, and
   sending second data from the first browser application to the trusted network destination.

20. The non-transitory computer readable storage medium of claim 19, wherein the isolated computing environment is isolated from the workspace.

\* \* \* \* \*